March 24, 1931.         E. A. WALKER         1,797,934
THREAD GAUGE
Filed July 27, 1929
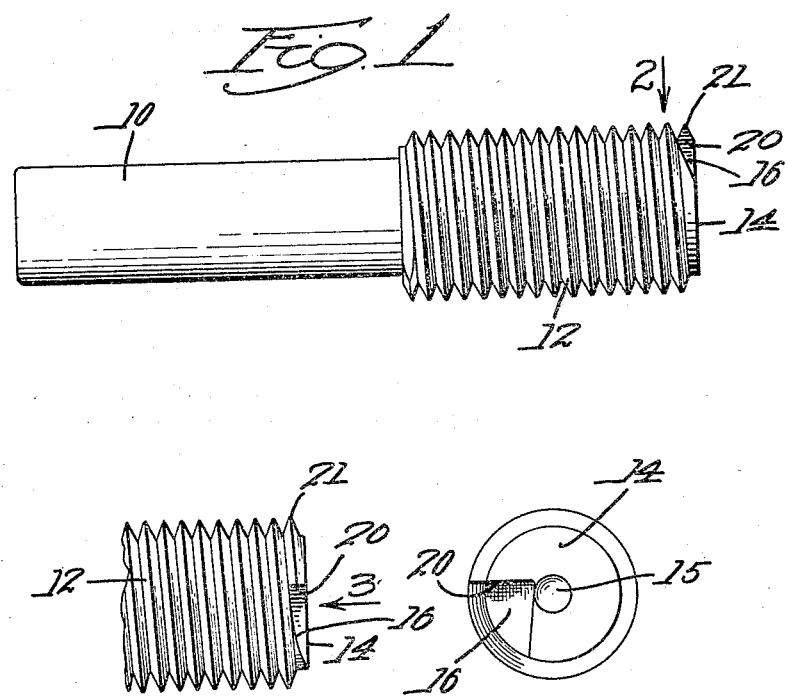
Inventor.
Ernest A. Walker.

Patented Mar. 24, 1931

1,797,934

UNITED STATES PATENT OFFICE

ERNEST A. WALKER, OF WORCESTER, MASSACHUSETTS, ASSIGNOR TO JOHN BATH, OF WORCESTER, MASSACHUSETTS

THREAD GAUGE

Application filed July 27, 1929. Serial No. 381,628.

This invention relates to a gauge for testing internally threaded work. It is essential that the grooves of the internal thread shall be cleared of all dirt or chips in order that the diameter may be determined within the limits of accuracy now demanded.

It is the general object of my invention to provide a gauge for internal threads so designed and constructed that it will more effectively clear the thread of foreign material as the gauge is inserted in the work.

To the attainment of this object, I so form the entering end of the first turn of the thread on the gauge that it will present an abrupt clearing surface to the groove of the internal thread and I also provide clearance so that dirt or chips removed by this abrupt shoulder may not clog the gauge.

My invention further relates to arrangements and combinations of parts which will be hereinafter described and more particularly pointed out in the appended claims.

A preferred form of the invention is shown in the drawings in which—

Fig. 1 is a side elevation of my improved thread gauge;

Fig. 2 is a partial plan view thereof; and

Fig. 3 is an end elevation thereof.

Referring to the drawings, I have shown my improved thread gauge as comprising a handle portion 10 which is enlarged to provide a continuously threaded portion 12 constituting the gauge proper. The end of the gauge is cut off to provide a plane surface 14 in which a center hole 15 may be formed.

I also provide an angular cut 16 in the end of the gauge 12, which cut may conveniently be formed by grinding with a wheel of suitable diameter. The surfaces of the cut are so disposed that an abrupt shoulder 20 is formed at the entering end of the first turn 21 of the thread on the gauge 12. The cut in the end surface 14 tapers or decreases in depth toward the axis of the gauge, extending inwardly beyond the base of the threaded portion 12, as indicated in Fig. 1, and also decreases in depth circumferentially away from the shoulder 20.

The portion removed by the grinding wheel is thus of such section that ample clearance is provided for the chips or dirt which are scraped from the internal thread by the abrupt shoulder 20 as the gauge is inserted in the work to be tested.

In actual commercial use, it has been found that a gauge provided with the cut 16 and the abrupt shoulder 20 is very efficient in clearing the internal thread and that the gauging of the thread may be performed with unusual accuracy.

Having thus described my invention and the advantages thereof, I do not wish to be limited to the details herein disclosed, otherwise than as set forth in the claims, but what I claim is:—

1. A gauge for internal threads comprising an externally threaded portion having an angular cut in the end thereof providing an abrupt clearing shoulder at the entering end of the first turn of the thread, said angular cut extending radially inward toward the axis of the gauge and beyond the base of said threaded portion and being reduced in axial depth toward said axis.

2. A gauge for internal threads comprising an externally threaded portion having an angular cut in the end thereof providing an abrupt clearing shoulder at the entering end of the first turn of the thread, said angular cut extending radially inward toward the axis of the gauge and beyond the base of said threaded portion and being gradually reduced in axial depth toward said axis and being also gradually reduced in depth circumferentially away from said shoulder.

In testimony whereof I have hereunto affixed my signature.

ERNEST A. WALKER.